United States Patent [19]

Ringer

[11] 4,211,033
[45] Jul. 8, 1980

[54] PLANT SUPPORT AND COMPOST ENCLOSURE

[75] Inventor: Charles J. Ringer, Long Lake, Minn.
[73] Assignee: Judd Ringer Corporation, Eden Prairies, Minn.
[21] Appl. No.: 970,629
[22] Filed: Dec. 18, 1978
[51] Int. Cl.² ............................................. A01G 9/12
[52] U.S. Cl. .......................................... 47/45; 47/58; 220/18; 220/19; 52/245; 220/5 R
[58] Field of Search .................. 47/23, 30–31, 47/44, 45, 47, 58; 52/245, 198, 581; 220/19, 1 R, 1 T, 4 R, 4 F, 5 R, 18

[56] References Cited

U.S. PATENT DOCUMENTS 3,951,294   4/1976   Wilson .................................. 220/5 R

OTHER PUBLICATIONS

"Ring Planting Gives Big Tomato Harvest", Minneapolis Tribune, May 27, 1979, p. 7H.

*Primary Examiner*—Robert E. Bagwill
*Attorney, Agent, or Firm*—Kinney, Lange, Braddock, Westman and Fairbairn

[57] ABSTRACT

A plant support and compost enclosure, comprising rigid panels of fencing wherein the spacing of the horizontal rods in the lower portion of each panel is much smaller than the spacing in the upper portion in order to better contain the compost. The rigid panels are connected by rings, thereby enabling the apparatus to stand without any support and have the ability of being folded flat for easy storage. A minimum of three rigid panels is needed for the apparatus to stand unsupported. The upper portion of one of the rigid panels does not contain any vertical or horizontal rods, so as to form an opening to facilitate the loading of composting material for compost production. The composting material is innoculated with micro-organisms and watered from time to time to produce compost. Plants, such as tomatoes, are planted around the perimeter of the apparatus to take advantage of both the nutrients and water seeping into the soil from the compost heap and the ready support available from the rigid panels of the apparatus.

6 Claims, 5 Drawing Figures

PLANT SUPPORT AND COMPOST ENCLOSURE

BACKGROUND OF THE INVENTION

This invention relates to gardening, and more particularly to the production of compost in an enclosure and using the enclosure to support plants. The plants take advantage of the nutrients seeping into the ground from the compost heap and the readily available support from the panels.

This method has been used in growing tomatoes in Japan, where a flexible section of fencing is used to contain compost while tomatoes are grown around the outside. The present invention improves on this gardening technique.

The old method requires lifting the composting material over the top of a fence in order to put it in and if the fencing is to be sufficiently high to allow tomatoes to grow to their full height, the height becomes a substantial distance. The present invention provides an opening whereby the composting material need only be lifted a short distance.

The present invention also incorporates narrowly spaced horizontal rigid rods near the bottom to contain the composting material and more widely spaced rigid rods near the top where the only purpose is to supply support for the plants. It is understood that the old method did not provide for this, resulting in improper containment of the compost or needless waste in fencing material at the top providing for plant support.

With the rigid panels being pivotally hinged to each other, it is possible to store or ship the support of the present invention in a relatively compact form as compared with a roll of fencing material.

The use of rigid panels causes the enclosure to be fully self-supporting and relatively resistant to tipping over. Furthermore, the self-supporting feature provides the home gardener with versatility in that he can easily move his composting pile each year to another place. The use of rigid rods in the panels provides for adequate support of the plants even when they bear relatively heavy fruit such as tomatoes.

SUMMARY OF THE INVENTION

It is an object of this invention, therefore, to provide an improved method and apparatus for the production of compost and support of plants thriving on the nutrients and moisture being emitted by the compost pile.

A further object of this invention is to provide in such apparatus an enclosure for compost having an improved access for the addition of composting material thereto.

Another object of the invention is to optimize the number of horizontal rods needed in compost containment and plant support.

Still another object of the invention is to provide a foldable compost enclosure and plant support, which can be readily shipped and stored.

It is an object also of this invention to provide an enclosure and plant support which is fully self-supporting and very resistant to tipping.

It is also an object of the invention to provide a compost enclosure which is well adapted for the support of plants growing around it.

Other objects of the invention will be apparent hereinafter from the specification and from the recital of the appended claims, particularly when read in conjunction with the accompanying drawings.

DESCRIPTION OF THE PREFERRED EMBODIMENT

Figure 1:
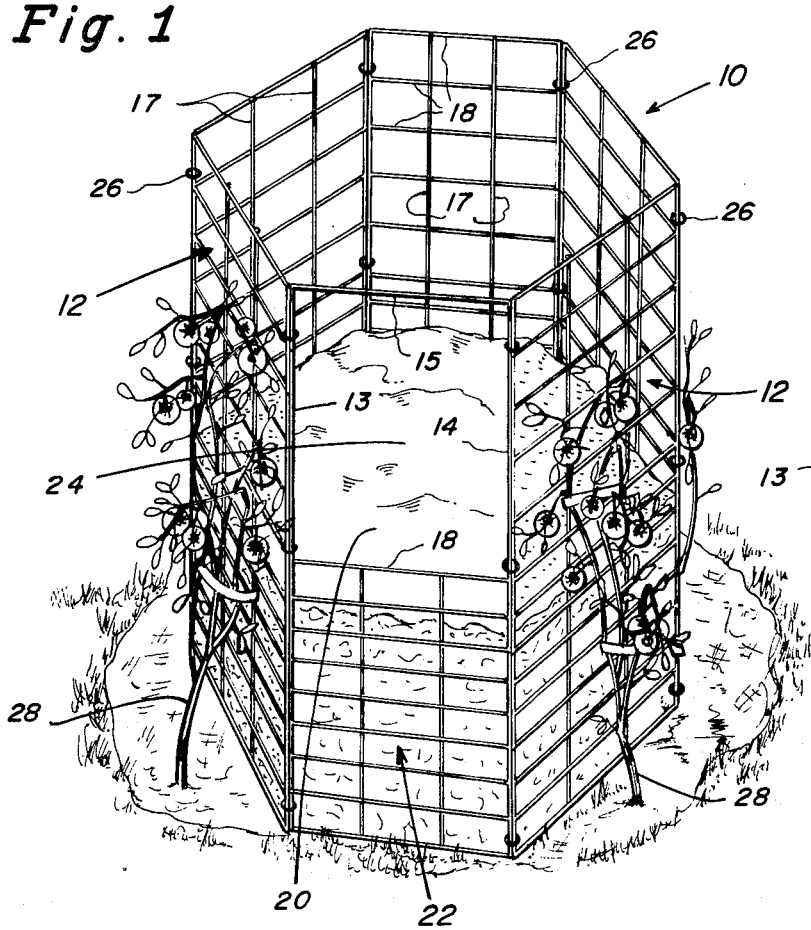
FIG. 1 is a perspective view of one embodiment of the present invention.

In reference to the embodiment described in FIG. 1, 10 denotes generally a preferred embodiment of a self-supporting compost enclosure and plant support of the present invention.

Figure 2:
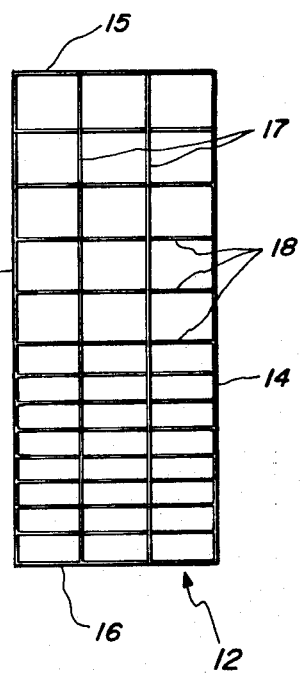
FIG. 2 is an elevational view of a panel of the compost enclosure of the present invention.

The rigid panels 12 comprising the present invention are shown in detail in FIG. 2. Each rigid panel 12 has a periphery defined by left and right relatively rigid vertical rods 13 and 14 and upper and lower relatively rigid horizontal rods 15 and 16. Within each rigid panel 12 is a combination of relatively rigid vertical rods 17 and similar horizontal rods 18 which are fixed as by welds, to each other at their junction points 19. In each panel 12, the horizontal rods 18 are positioned closer together in the lower portion, to aid in the containment of the composting material generally shown at 20 in FIG. 1. The horizontal rods 18 in the upper portion of each panel are farther apart since their primary function is for support. Arranging the horizontal rods 18 as described and as shown in FIG. 2 optimizes the number of rods needed for each rigid panel 12, thus saving material.

The front panel 22 has no vertical rods 17 or horizontal rods 18 in the upper portion except for the rods 13, 14 and 15 that define the periphery of the opening generally shown at 24. The opening 24 facilitates the loading of composting material.

Figure 3:
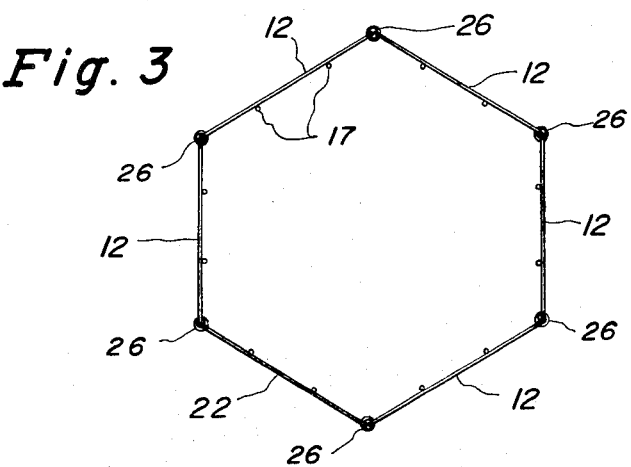
FIG. 3 is a top view of the compost enclosure of FIG. 1
Figure 5:
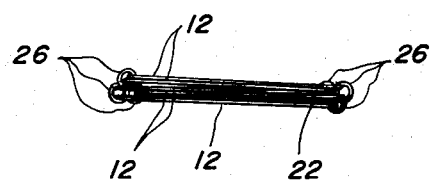
FIG. 5 shows the enclosure of FIG. 4 completely folded.
Figure 4:
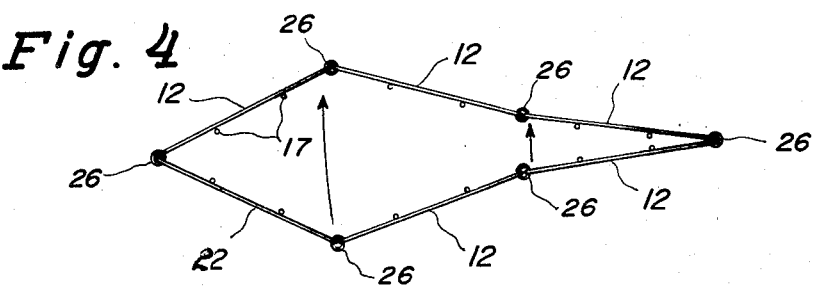
FIG. 4 is a top view similar to FIG. 3 but showing the enclosure partially folded.

The rigid panels 12, including front panel 22, are connected to each other by rings 26 or other means which allow each rigid panel 12 to freely pivot. The rings 26 serve pivotally to hold the rigid panels 12, thus permitting them to assume a hexagonal configuration, thereby enabling the enclosure of the present invention to be self-supporting. The rings 26, because they loosely hold the sections 12 together, allow the enclosure of the present invention to be folded in a substantially flat form as depicted by the sequence in FIGS. 3, 4 and 5. If the sections were pivotally connected by relatively tight pivotal connections, it would be impossible to fold all of the sections in an overlying relationship.

It would be obvious to one skilled in the art that the number of rigid panels could be varied and produce the same results.

In use, the present invention is filled with layers of organic wastes such as leaves, grass clippings and garden wastes. Each layer of composting material should be innoculated with micro-organisms and then watered. The tomato plants 28 shown in FIG. 1, are planted on the outside of the compost enclosure. The soil surrounding the enclosure is suitably pulverized before the tomato plants are planted. It is also desirable that a fertilizer designed for tomatoes be introduced into the soil. The tomato plants are tied to the rods as they grow.

As the compost pile develops, nutrients are leached into the soil through periodic watering and are picked up by the plants. The compost heap acts as a reservoir for the moisture. Thus the plants obtain both water and nutrients on a continual basis from the compost heap during their growing season and especially during the critical fruit bearing time. The front panel 22 where no plants are planted allows access to the compost pile through the opening 24 without disturbing the tomatoes growing around the present invention.

It should be appreciated that the present invention may be easily stored in a flat form during the winter, if so desired. It can also be moved easily since there are no posts anchoring it to the ground.

It is apparent that various modifications of the structure herein set forth can be made without departing from the spirit and scope of the present invention and that this application is intended to cover such modifications.

What is claimed is:

1. A combination plant support and compost enclosure apparatus comprising:
    a plurality of substantially vertical rigid panels, each panel including a set of generally vertical spaced rods and a set of generally horizontal spaced rods, said rods being secured to each other at their junction points, one of said panels acting as a front panel and having vertical and horizontal rods omitted in the upper portion thereof to provide an opening therethrough, substantially larger than the opening defined by said vertical and horizontal rods for the introduction of compost into the enclosure; and
    means pivotally connecting each said panel to adjacent panels to form a rigid structure that can stand without support and be collapsed to a substantially flat form.

2. A combination plant support and compost enclosure apparatus as defined in claim 1, wherein the distance between horizontal rods is greater in the upper portion of each panel than in the lower portion.

3. A combination plant support and compost enclosure as defined in claim 1, wherein the pivotally connecting means loosely encircles the adjacent vertical rods of adjacent panels to facilitate the collapsing of the rigid panels to a substantially flat form.

4. A combination plant support and compost enclosure apparatus as defined in claim 1, wherein the number of panels is six and the standing structure is hexagonal.

5. A method of nourishing and supporting plants, comprising:
    providing the apparatus of claim 1
    partially filling said structure apparatus through a substantial opening in the upper portion of one of said panels with composting material for the production of compost;
    innoculating said composting material with microorganisms;
    planting seeds or plants in the soil outside of the periphery of the apparatus to take advantage of the nutrients escaping from the compost; and
    watering said composting material to help microorganisms thrive and aid in the production of compost, and to provide moisture for said seeds or plants 6. The method of claim 5 in which fertilizer is mixed in to the soil outside of the periphery of the apparatus at the time that the seeds or plants are planted therein.

* * * * *